(12) United States Patent
Zlotnick

(10) Patent No.: US 7,917,844 B1
(45) Date of Patent: Mar. 29, 2011

(54) DIRECTORY SERVICE FOR FORM PROCESSING

(75) Inventor: Aviad Zlotnick, Mizpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 2792 days.

(21) Appl. No.: 09/616,977

(22) Filed: Jul. 14, 2000

(51) Int. Cl.
*G06N 3/00* (2006.01)

(52) U.S. Cl. ...................................................... 715/234

(58) Field of Classification Search .................. 715/505, 715/513, 517, 523, 530; 463/25, 117; 382/310, 382/227, 149, 309; 707/103 R; 345/762; 705/26, 27, 412, 415, 416, 418, 500; 483/25
See application file for complete search history.

(56) References Cited

U.S. PATENT DOCUMENTS

| | | | | |
|---|---|---|---|---|
| 4,928,313 A * | 5/1990 | Leonard et al. | | 382/149 |
| 5,182,656 A | 1/1993 | Chevion et al. | | |
| 5,191,525 A | 3/1993 | Le Brun et al. | | |
| 5,455,875 A | 10/1995 | Chevion et al. | | |
| 5,579,407 A * | 11/1996 | Murez | | 382/164 |
| 5,625,721 A * | 4/1997 | Lopresti et al. | | 380/309 |
| 5,793,887 A | 8/1998 | Zlotnick | | |
| 5,805,747 A * | 9/1998 | Bradford | | 382/310 |
| 5,881,172 A * | 3/1999 | Pintsov | | 382/227 |
| 5,889,897 A * | 3/1999 | Medina | | 382/310 |
| 5,933,531 A * | 8/1999 | Lorie | | 382/229 |
| 5,987,471 A * | 11/1999 | Bodine et al. | | 707/103 R |
| 6,028,970 A * | 2/2000 | DiPiazza et al. | | 382/309 |
| 6,055,516 A * | 4/2000 | Johnson et al. | | 705/27 |
| 6,113,493 A * | 9/2000 | Walker et al. | | 463/25 |
| 6,243,450 B1 * | 6/2001 | Jansen et al. | | 379/144.01 |
| 6,270,406 B1 * | 8/2001 | Sultan | | 463/17 |
| 6,343,149 B1 * | 1/2002 | Motoiwa | | 382/209 |
| 6,381,582 B1 * | 4/2002 | Walker et al. | | 705/26 |
| 6,498,612 B1 * | 12/2002 | Brown et al. | | 345/762 |
| 6,741,724 B1 * | 5/2004 | Bruce et al. | | 382/101 |

OTHER PUBLICATIONS

Dietz, Alex, "Acxiom-InfoBase: A Fresh Look at Address Verification", May 2000, pp. 1-4.

* cited by examiner

*Primary Examiner* — Kyle R Stork

(57) ABSTRACT

A method for processing a document including a field containing information in a predefined domain includes defining a directory of data relating to the predefined domain. An image of the field containing the information is received from a client via a computer network. The image is processed to code the information, and the coded information is looked up in the directory so as to check whether the information is coded correctly.

33 Claims, 2 Drawing Sheets

DIRECTORY SERVICE FOR FORM PROCESSING

FIELD OF THE INVENTION

The present invention relates generally to computerized information processing, and specifically to extracting data from filled-in form documents.

BACKGROUND OF THE INVENTION

Methods for extraction of information filled into form documents are well known in the art. Typically, a document is printed with a form template. The template contains pre-defined fields that are filled in by a user with appropriate characters. The document is scanned into a computer, which typically uses an optical character recognition (OCR) program to identify and code the characters in each field.

OCR identification of handwritten, or even typed, characters can be uncertain, due to a range of problems including uneven scan quality, variable character shapes, and interference between the filled-in characters and features of the printed template. A variety of methods and systems have been developed to deal with these problems. For example, U.S. Pat. Nos. 5,182,656, 5,191,525 and 5,793,887, whose disclosures are incorporated herein by reference, describe methods for registering a document image with a form template so as to remove the template and extract the filled-in information from the form. Once the form is accurately registered with the known template, it is a simple matter for the computer to assign the fill-in characters to the appropriate fields. Dropping the template from the document image also reduces substantially the volume of memory required to transmit or store the image.

Because of the uncertainty of machine identification of characters by OCR, methods have been developed for selectively verifying the correctness of coded results. For example, U.S. Pat. No. 5,455,875, whose disclosure is incorporated herein by reference, describes a system and method for correction of optical character recognition, based on an interactive display of OCR results that is designed to enable an operator to correct erroneous character data reliably and efficiently.

Even in data that are not generated by OCR, there are commonly errors and inconsistencies, such as address information that is out of date or misspelled. To deal with problems of this sort, a number of companies offer address verification services, in which a mailing list is checked against an up-to-date master list. One example of such a service is "InfoBase BestAddress," offered by Acxiom Corporation, as described at www.acxiom.com. This service both identifies incorrect addresses and, where possible, provides corrections. The U.S. Postal Service offers master address databases that can be used to do this sort of verification.

SUMMARY OF THE INVENTION

In preferred embodiments of the present invention, a directory service receives information extracted from a form that has been filled in by a user. The information is typically sent to the directory service via a computer network by a client, who has received the filled-in form from the user and needs the information contained in one or more fields on the form to be coded and checked. The service returns coded, verified results to the client over the network. Typically, multiple fields on multiple copies of the form, filled in by different users, are processed in this manner.

To deal with the information that is to be sent by the client, the directory service defines and assembles a directory of data that is specific to a domain or category to which the information belongs. Preferably, the service assembles the specific directory by culling the data from other, more general databases. The service codes the information filled into the form. It then looks up the coded information in the directory to check whether the information is coded correctly, to correct errors when they are detected, and/or to choose among a number of possible codes when the coding is uncertain. The use of the specific, focused directory enables the service to search and check the coded information with greater reliability and speed than are generally achievable with general-purpose databases, such as public-domain telephone and address listings.

In some preferred embodiments of the present invention, the users fill in the forms by writing or typing characters into the fields. Preferably, the client sends images of the filled-in field to the service via the network, and the service uses OCR techniques to code the characters. Alternatively, the client may itself code the characters in the field and then send the coded results, or a number of alternative codes, to the service. In either case, by checking the OCR output against the directory, the service is able to identify and eliminate errors in the OCR coding and to reduce the number of uncertain OCR readings that need to be passed to a human operator for verification. Thus, by using the directory service, a client who is not expert in OCR and does not have convenient access to appropriate, focused directories is able to obtain high-quality coding results without a major investment in acquiring new infrastructure or capabilities.

Preferably, the client pays the service for providing the coded information on the basis of the quantity of information that is processed. Most preferably, the payment is calculated based upon a price per field processed. Alternatively, the payment may be on the basis of processing resources, such as CPU time, expended in coding and verifying the information, or on a fixed price or subscription basis, or on substantially any other commercial basis that is known in the art.

There is therefore provided, in accordance with a preferred embodiment of the present invention, a method for processing a document including a field containing information in a predefined domain, the method including:

defining a directory of data relating to the predefined domain;

receiving from a client via a computer network an image of the field containing the information;

processing the image to code the information; and looking up the coded information in the directory so as to check whether the information is coded correctly.

Preferably, the method includes returning the checked, coded information over the network to the client. Most preferably, receiving the image of the field includes receiving a number of fields filled in with respective information, regarding which the checked, coded information is returned to the client, and the method includes receiving payment from the client according to the number of the fields.

Preferably, defining the directory includes selecting data specific to the predefined domain from one or more general databases.

In a preferred embodiment, receiving the image includes receiving an image of alphanumeric characters in the field. Preferably, the document includes a template delineating the field, and wherein receiving the image of the characters includes receiving the image of the characters filled into the field and remaining after drop-out of the template from the image of the field. Further preferably, processing the image includes applying computerized optical character recognition (OCR) to code the characters. Most preferably, looking up the coded information includes selecting a preferred reading of the characters from among two or more possible readings generated by the OCR, responsive to the data in the directory. Additionally or alternatively, looking up the coded information includes generating a confidence score, and processing the image includes passing the image to a human operator for coding when the confidence score is below a predetermined threshold.

Preferably, looking up the coded information includes detecting an error in the coded information and correcting the error using the data in the directory.

There is also provided, in accordance with a preferred embodiment of the present invention, a method for processing forms, each form including a field that is filled in with information in a predefined domain, the method including:

defining a directory of data relating to the predefined domain by selecting data specific to the domain from one or more general databases;

receiving from a client via a computer network the information that is filled into the field on the forms by a plurality of users in communication with the client; and checking whether the information is correct by looking up the information in the directory.

Preferably, receiving the information includes receiving coded information, and checking whether the information is correct includes checking whether the coded information is correct.

There is additionally provided, in accordance with a preferred embodiment of the present invention, apparatus for processing a document including a field containing information in a predefined domain, the apparatus including:

a memory, in which a directory of data relating to the predefined domain is stored; and a directory service processor, adapted to receive from a client via a computer network an image of the field containing the information, to process the image to code the information, and to look up the coded information in the directory so as to check whether the information is coded correctly.

There is additionally provided, in accordance with a preferred embodiment of the present invention, apparatus for processing forms, each form including a field that is filled in with information in a predefined domain, the apparatus including:

a memory, in which a directory of data relating to the predefined domain is stored by selecting data specific to the domain from one or more general databases; and a processor, adapted to receive from a client via a computer network the information that is filled into the field on the forms by a plurality of users in communication with the client, and to check whether the information is correct by looking up the information in the directory.

There is moreover provided, in accordance with a preferred embodiment of the present invention, a computer software product for processing a document including a field that contains information in a predefined domain, the product including a computer-readable medium in which program instructions are stored, which instructions, when read by a computer, cause the computer to receive a definition of a directory of data relating to the predefined domain and, upon receiving from a client via a computer network an image of the field containing the information, to process the image so as to code the information and to look up the coded information in the directory so as to verify that the information is coded correctly.

There is furthermore provided, in accordance with a preferred embodiment of the present invention, a computer software product for processing forms, each form including a field that is filled in with information in a predefined domain, the product including a computer-readable medium in which program instructions are stored, which instructions, when read by a computer, cause the computer to receive a definition of a directory of data relating to the predefined domain generated by selecting data specific to the domain from one or more general databases, and upon receiving from a client via a computer network the information that is filled into the field on the forms by a plurality of users in communication with the client, to verify correctness of the information by looking up the information in the directory.

The present invention will be more fully understood from the following detailed description of the preferred embodiments thereof, taken together with the drawings in which:

DETAILED DESCRIPTION OF PREFERRED EMBODIMENTS

Figure 1:
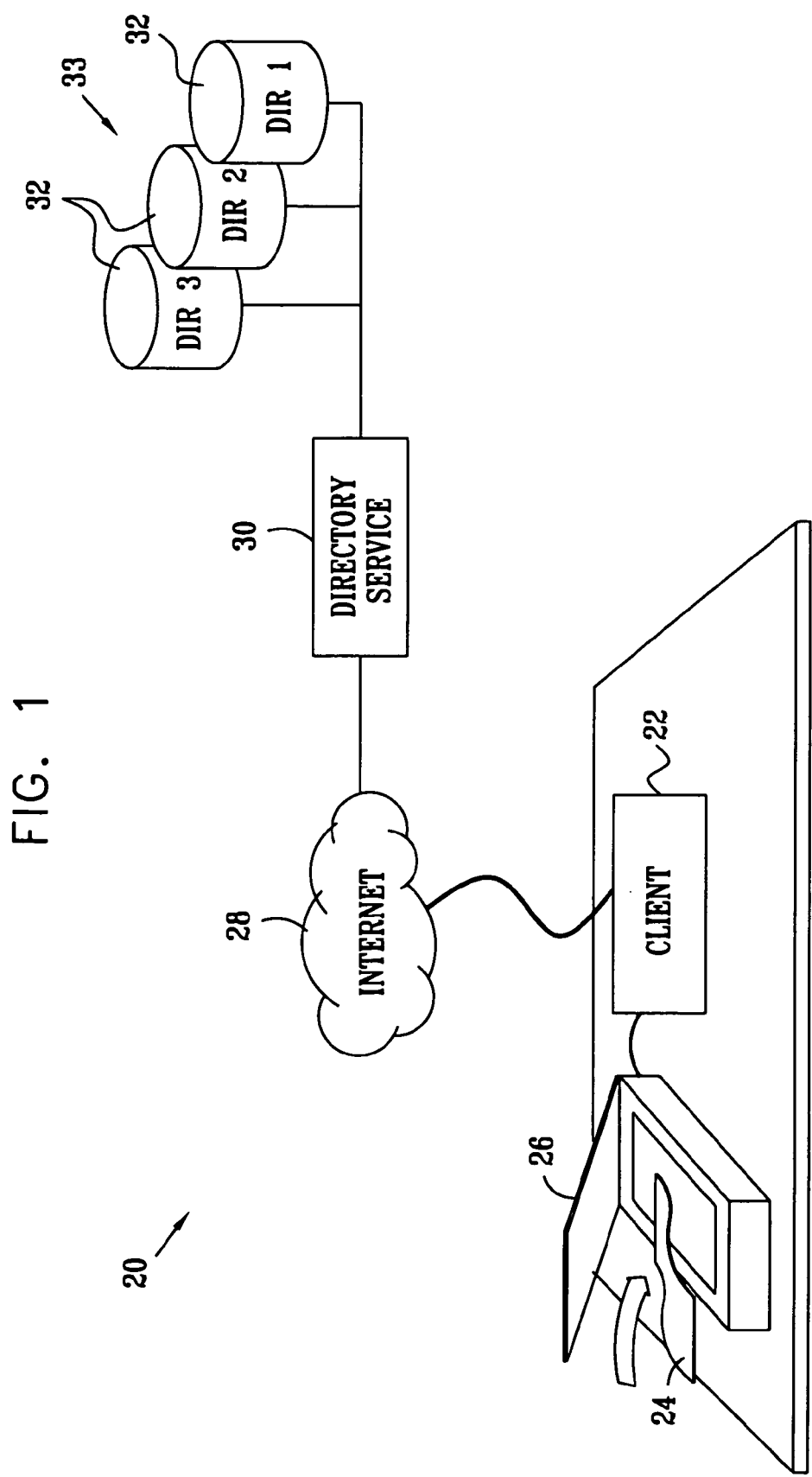
FIG. 1 is a block diagram that schematically illustrates a system for processing information filled into forms, in accordance with a preferred embodiment of the present invention.

FIG. 1 is a block diagram that schematically illustrates a system 20 for processing information filled into a form 24, in accordance with a preferred embodiment of the present invention. In the scenario shown in FIG. 1, a client 22, such as a system integrator, is responsible for automating data collection from a large number of forms, but does not have in house the capabilities needed to process the data automatically. Rather than purchasing software and developing the necessary capabilities, which would require a large investment of time and capital, client 22 contracts with a directory service 30 to perform the processing. The directory service typically comprises one or more suitable computer processors with software for carrying out the methods described hereinbelow. The software may be furnished to the directory service in electronic form, via a network or other link, or it may be supplied on tangible media, such as CD-ROM or non-volatile memory.

Each filled-in form received by client 22 is scanned by a scanner 26 to form an electronic image of the form, as is known in the art. The client sends the entire form image or selected elements of the image, as described hereinbelow, to service 30 via a computer network 28, typically via the Internet. The directory service applies OCR to code the characters filled into the form, and then uses one or more directories 32 stored in a memory or other storage device 33 to detect coding errors and, where possible, to fix them. For example, assuming form 24 to be a medical insurance form, which includes fields for the name and address of a treating physician, the directory service would preferably procure or produce a directory of physicians against which to verify this information. After completing the coding and verification process, service 30 returns the coded results via network 28 to client 22.

Figure 2:
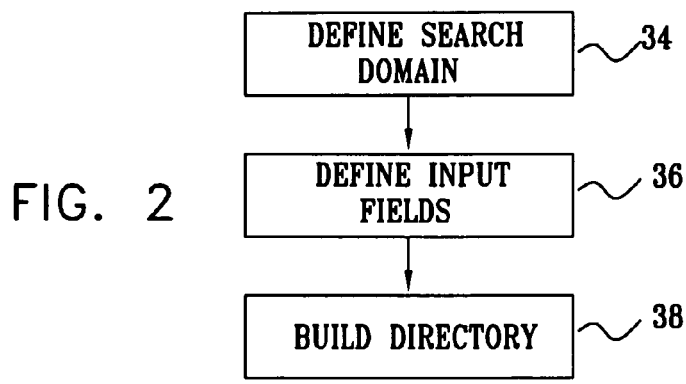
FIG. 2 is a flow chart that schematically illustrates a method for building a directory, in accordance with a preferred embodiment of the present invention.

FIG. 2 is a flow chart that schematically illustrates a method by which directory service 30 assembles the directory needed for a particular verification job, in accordance with a preferred embodiment of the present invention. Together with client 22, the directory service defines a domain over which the information in form 24 is to be searched, at a search definition step 34. This domain might be the population of practicing physicians in the United States, for example.

At the same time, the directory service receives a definition of the specific fields that are to be coded, at a field definition step 36. In the case of the insurance form mentioned above, for example, these fields might include the physician's name, address and specialization, as well as an identification of the patient and the procedure carried out. The client and directory service preferably also agree at this stage as to the form in which the field contents for processing are to be sent from the client to the service. Preferably, the client sends electronic images of the fields, which are to be coded by the service using OCR. Alternatively, the field contents may be sent to the service already in coded form. This will be the case, for example, when the client itself performs the OCR (thereby reducing the volume of data that must be sent over network 28) or when the forms have been filled in electronically, so that OCR is not required. Although in this latter case the directory service no longer needs to deal with OCR coding errors, directory lookup is still useful in detecting and correcting typographical errors and other inaccuracies.

Based on the domain and field definitions, the directory service preferably assembles a special-purpose directory for use in verifying the results of coding the filled-in forms, at a directory building step 38. Preferably, the directory service purchases and maintains a stock of specialized databases, such as the physician directory mentioned above. Alternatively or additionally, the directory service builds and maintains directories of its own, typically by assembling information from general, public-domain databases and from other available sources. Further alternatively or additionally, general databases, such as postal or telephone directories, may be used when appropriate. Most preferably, the directory service employs agents and surveys sources of information to keep its directories up to date.

Figure 3:
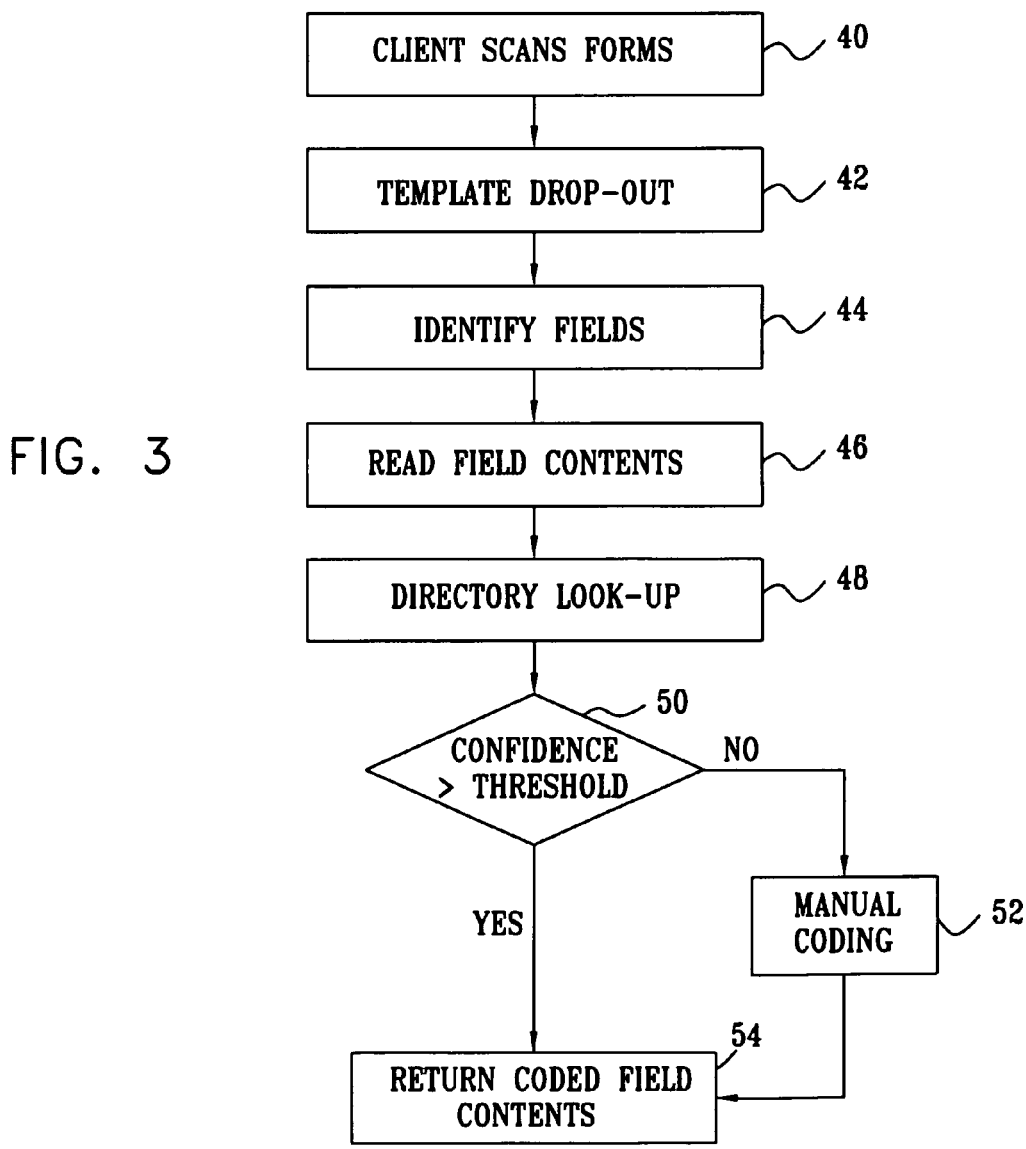
FIG. 3 is a flow chart that schematically illustrates a method for processing information filled into a form, in accordance with a preferred embodiment of the present invention.

FIG. 3 is a flow chart that schematically illustrates a method for processing the information in form 24 by directory service 30, in accordance with a preferred embodiment of the present invention. This method uses the field definitions and directory generated at steps 36 and 38, as described above. The description of the method of FIG. 3 assumes that client 22 receives paper forms, comprising a template filled in by users with handwritten or printed characters. The method is also applicable, however, mutatis mutandis, to forms that are filled in electronically.

Each form 24 that is received by client 22 is scanned to generate an electronic image of the form, at a form input step 40. Preferably, a template registration and drop-out program, as is known in the art, is provided on the client's computer in order to register the image with a template of the form and to remove the template from the image. Suitable methods for this purpose are described, for example, in the above-mentioned U.S. Pat. Nos. 5,182,656, 5,191,525 and 5,793,887. Removal of the template reduces the volume of information that must be transmitted over network 28 to directory service 30 and makes subsequent OCR processing easier and more accurate. Alternatively, client 22 transmits the entire image to service 30, and template drop-out is performed by the service or not at all.

Following template drop-out, the fields to be coded by the directory service are located on the form, at a field identification step 44. The identification is typically based on predefined positions of the fields in the form template. Preferably, this step, as well, is performed by suitable software operated by client 22, whereby only the images of the specific fields of interest are transmitted subsequently to service 30. Alternatively, the appropriate fields for processing are extracted from the overall image by the directory service.

The images of the selected fields are read and coded, at a content reading step 46. Any suitable method of OCR that is known in the art may be used at this step (assuming that form 24 is a paper form, whose content must be coded). Preferably, the OCR program returns one or more possible readings of the content, each with a respective confidence score. The results of the coding are checked against the data in the selected directory, at a lookup step 48. When step 46 returned only a single reading, step 48 is used to confirm that the coded contents agree with one of the entries in the directory (for example, that the physician's name, address and specialty all match). Preferably, a "fuzzy," error-tolerant search algorithm is used, so that small errors, such as misspellings or OCR misreadings, can be detected and corrected, without leading to rejection of an otherwise valid coding result. An exemplary search algorithm of this type is described by Wu et al., in an article entitled, "AGREP—A Fast Approximate Pattern-Matching Tool," published in *Proceedings of the Winter 1992 USENIX Conference*, pages 153-162, which is incorporated herein by reference. When multiple, alternate readings are suggested by step 46, the directory lookup at step 48 is used to choose the most likely reading among the alternatives.

Step 48 thus either confirms or modifies the coding result generated at step 46. Preferably, the confidence score from step 46 is also modified by step 48, typically increasing the confidence level to "certain" when an OCR reading is found to correspond with high likelihood to an entry in the directory. On the other hand, when the OCR reading does not correspond to any directory entry, its confidence level may be reduced. At a confidence checking step 50, the confidence level of the coding result is compared to a predetermined threshold. If the confidence is below threshold, the original field is passed to a human operator, preferably together with the (uncertain) coding results, at a manual coding step 52. Any suitable method of data presentation may be used to assist the operator in processing the information efficiently and reliably, such as that described in U.S. Pat. No. 5,455,875. The operator either confirms or selects the appropriate coding result from among the alternatives offered by the OCR, or enters a different, correct result.

The verified coding result for each field is returned to client 22 at a concluding step 54. Preferably, the directory service charges the client for its work on the basis of the number of fields, words or characters that have been processed. Alternatively, the charge may be based on a fixed, periodic payment, or on a measure of use of the resources of the directory service, such as CPU time, or on substantially any other payment basis known in the art.

While preferred embodiments described herein relate particularly to form documents and OCR coding, it will be understood that the principles of the present invention are similarly applicable to error checking, correction and verification of data coding generated by other methods and to processing documents of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing documents including information in a predefined domain, the method comprising:
   defining a directory of data relating to the predefined domain;
   receiving from a client via a computer network images of a number of fields containing respective information;
   processing the images to code the information;
   looking up the coded information in the directory so as to check whether the information is coded correctly;
   returning the checked, coded information over the network to the client; and
   receiving payment from the client in exchange for coding and checking the information according to the number of the fields processed, based upon a price per field processed.

2. A method according to claim 1, wherein defining the directory comprises selecting data specific to the predefined domain from one or more general databases.

3. A method according to claim 1, wherein receiving the images comprises receiving images of alphanumeric characters in the fields.

4. A method according to claim 3, wherein the documents includes a template delineating the fields, and wherein receiving the images of the characters comprises receiving the images of the characters filled into the fields and remaining after drop-out of the template from the image of the fields.

5. A method according to claim 3, wherein processing the images comprises applying computerized optical character recognition (OCR) to code the characters.

6. A method according to claim 5, wherein looking up the coded information comprises selecting a preferred reading of the characters from among two or more possible readings generated by the OCR, responsive to the data in the directory.

7. A method according to claim 5, wherein looking up the coded information comprises generating a confidence score, and wherein processing the images comprises passing the images to a human operator for coding when the confidence score is below a predetermined threshold.

8. A method according to claim 5, wherein looking up the coded information comprises detecting an error in the coded characters and correcting the error using the data in the directory.

9. A method according to claim 1, wherein looking up the coded information comprises detecting an error in the coded information and correcting the error using the data in the directory.

10. A method for processing forms, each form including a field that is filled in with information in a predefined domain, the method comprising:
    defining, in advance of reading out contents of the forms for processing, a directory of data relating to the predefined domain by selecting data specific to the domain from one or more general databases;
    receiving from a client via a computer network the information that is filled into the field on the forms by a plurality of users in communication with the client; and
    checking whether the information is correct by looking up the information in the directory.

11. A method according to claim 10, wherein receiving the information comprises receiving coded information, and wherein checking whether the information is correct comprises checking whether the coded information is correct.

12. A method according to claim 11, wherein receiving the coded information comprises receiving coded characters generated by the client using optical character recognition (OCR).

13. A method according to claim 10, wherein receiving the information comprises receiving an image of the field, and comprising processing the image to code the information, wherein checking whether the information is correct comprises checking whether the information was coded correctly by looking up the coded information in the directory.

14. A method according to claim 10, and comprising returning the checked information over the network to the client.

15. A method according to claim 14, and comprising receiving payment from the client according to a number of the forms for which the correctness of the information in the field was checked.

16. A method according to claim 14, wherein checking whether the information is correct comprises detecting an error in the information, and comprising correcting the error using the data in the directory.

17. Apparatus for processing a documents including information in a predefined domain, the apparatus comprising:
    a memory, in which a directory of data relating to the predefined domain is stored; and
    a directory service processor, adapted to receive from a client via a computer network images of a number of fields containing respective information, to process the images to code the information, to look up the coded information in the directory so as to check whether the information is coded correctly, to return the checked, coded information over the network to the client, and to receive payment from the client in exchange for coding and checking the information according to the number of the fields processed, based upon a price per field processed.

18. Apparatus according to claim 17, wherein the directory comprises data specific to the predefined domain, which are selected from one or more general databases.

19. Apparatus according to claim 17, wherein the images comprises alphanumeric characters filled into the fields.

20. Apparatus according to claim 19, wherein the documents includes a template delineating the fields, and wherein the characters in the images comprise the characters remaining after drop-out of the template from the images of the fields.

21. Apparatus according to claim 19, wherein the processor is adapted to apply computerized optical character recognition (OCR) to code the characters.

22. Apparatus according to claim 21, wherein the processor is further adapted to select a preferred reading of the characters from among two or more possible readings generated by the OCR, responsive to the data in the directory.

23. Apparatus according to claim 21, wherein the processor is further adapted to generate a confidence score in a reading generated by the OCR, and to pass the image to a human operator for coding when the confidence score is below a predetermined threshold.

24. Apparatus according to claim 21, wherein the processor is adapted to detect an error in the coded characters and to correct the error using the data in the directory.

25. Apparatus according to claim 17, wherein the processor is adapted to detect an error in the coded information and to correct the error using the data in the directory.

26. Apparatus for processing forms, each form including a field that is filled in with information in a predefined domain, the apparatus comprising:

a memory, in which a directory of data relating to the predefined domain is stored by selecting data specific to the domain from one or more general databases in advance of reading out contents of the forms for processing; and a processor, adapted to receive from a client via a computer network the information that is filled into the field on the forms by a plurality of users in communication with the client, and to check whether the information is correct by looking up the information in the directory.

27. Apparatus according to claim 26, wherein the processor is adapted to receive coded information, and to check that the information is coded correctly.

28. Apparatus according to claim 26, wherein the processor is adapted to receive an image of the field and to process the image to code the information, wherein the processor is adapted to check whether the information was coded correctly by looking up the coded information in the directory.

29. Apparatus according to claim 26, wherein the processor is adapted to return the checked information over the network to the client.

30. Apparatus according to claim 26, wherein the processor is adapted to detect an error in the information, and to correct the error using the data in the directory.

31. A computer software product for processing documents including information in a predefined domain, the product comprising a computer-readable medium in which program instructions are stored, which instructions, when read by a computer, cause the computer to receive a definition of a directory of data relating to the predefined domain and, upon receiving from a client via a computer network images of a number of fields containing respective information, to process the images so as to code the information, to look up the coded information in the directory so as to check whether the information is coded correctly, to return the checked, coded information over the network to the client, and to receive payment from the client in exchange for coding and checking the information according to the number of the fields processed, based upon a price per field processed.

32. A product according to claim 31, wherein the images comprises alphanumeric characters filled into the fields, and wherein the instructions cause the computer to apply optical character recognition (OCR) to code the characters.

33. A computer software product for processing forms, each form including a field that is filled in with information in a predefined domain, the product comprising a computer-readable medium in which program instructions are stored, which instructions, when read by a computer, cause the computer to receive a definition of a directory of data relating to the predefined domain generated by selecting, in advance of reading out contents of the forms for processing, data specific to the domain from one or more general databases, and upon receiving from a client via a computer network the information that is filled into the field on the forms by a plurality of users in communication with the client, to check whether the information is correct by looking up the information in the directory.

* * * * *